US012731916B2

(12) United States Patent
Liptak et al.

(10) Patent No.: US 12,731,916 B2
(45) Date of Patent: Sep. 8, 2026

(54) COAXIAL ELECTRICAL TERMINAL WITH CRIMPED OUTER FERRULE

(71) Applicant: Aptiv Technologies AG, Schaffhausen (CH)

(72) Inventors: Nicole Liptak, Cortland, OH (US); Michael Messuri, Canfield, OH (US)

(73) Assignee: Aptiv Technologies AG, Schaffhausen (CH)

( * ) Notice: Subject to any disclaimer, the term of this patent is extended or adjusted under 35 U.S.C. 154(b) by 228 days.

(21) Appl. No.: 18/079,742

(22) Filed: Dec. 12, 2022

(65) Prior Publication Data

US 2024/0195086 A1 Jun. 13, 2024

(51) Int. Cl.

*H01R 4/18* (2006.01)
*H01R 43/048* (2006.01)
*H01R 24/40* (2011.01)
*H01R 103/00* (2006.01)

(52) U.S. Cl.

CPC ........... *H01R 4/185* (2013.01); *H01R 43/048* (2013.01); *H01R 24/40* (2013.01); *H01R 2103/00* (2013.01)

(58) Field of Classification Search

CPC .......... H01R 4/18; H01R 4/183; H01R 4/185; H01R 4/187; H01R 4/188; H01R 4/20; H01R 9/034; H01R 9/05; H01R 9/0524; H01R 11/28; H01R 13/436; H01R 13/58; H01R 13/4364; H01R 13/6583; H01R 24/40; H01R 43/048; H01R 43/28; H01R 2103/00

USPC ..... 439/578, 585, 607.47, 607.48, 822, 877, 439/879; 174/74 R, 75 C, 78, 79, 84 R, 174/84 C, 88 C, 89, 93, 94 R

See application file for complete search history.

(56) References Cited

U.S. PATENT DOCUMENTS

| | | | | | |
|---|---|---|---|---|---|
| 3,032,602 | A * | 5/1962 | Farnell | H01R 4/184 | 439/877 |
| 3,051,773 | A * | 8/1962 | Batcheller | H01R 4/185 | 29/521 |
| 3,404,368 | A * | 10/1968 | Roberts | H01R 24/20 | 439/867 |
| 4,692,122 | A * | 9/1987 | Montalbano | H01R 4/184 | 29/863 |

(Continued)

FOREIGN PATENT DOCUMENTS

| | | | |
|---|---|---|---|
| EP | 3460916 | A1 | 3/2019 |
| EP | 3528343 | A1 | 8/2019 |

(Continued)

OTHER PUBLICATIONS

"Extended European Search Report"; European Patent Office; mailed on Feb. 6, 2024; 11 Pages.

*Primary Examiner* — William H. Mayo, III
(74) *Attorney, Agent, or Firm* — Billion & Armitage

(57) ABSTRACT

A coaxial electrical cable assembly includes a coaxial electrical terminal having an inner ferrule disposed between an insulator surrounding a central conductor of a coaxial cable and a shield conductor of the coaxial cable and an outer ferrule crimped to the shield conductor and in compressive contact therewith. The outer ferrule defines a pair of crimp wings extending from a first side of a base portion of the outer ferrule and a single crimp wing extending from a second side of the base portion opposite the first side. The single crimp wing is disposed within a gap between the pair of crimp wings.

17 Claims, 2 Drawing Sheets

(56) References Cited

U.S. PATENT DOCUMENTS

| | | | | |
|---|---|---|---|---|
| 5,965,847 | A * | 10/1999 | Tanaka | H01R 9/0518 439/607.07 |
| 6,875,063 | B2 * | 4/2005 | Zhao | H01R 13/187 439/787 |
| 7,160,150 | B2 * | 1/2007 | Annequin | H01R 43/048 439/585 |
| 7,422,480 | B1 * | 9/2008 | Musick | H01R 9/0518 439/879 |
| 8,991,045 | B2 | 3/2015 | Poma et al. | |
| 9,899,775 | B2 | 2/2018 | Bergner et al. | |
| 10,008,786 | B2 * | 6/2018 | Brantingham | H01R 43/28 |
| 10,199,780 | B2 | 2/2019 | Volkmann et al. | |
| 10,707,597 | B2 * | 7/2020 | Bergner | H01R 11/28 |
| 10,741,975 | B2 * | 8/2020 | Jones | H01R 13/6583 |
| 10,770,822 | B2 * | 9/2020 | Maesoba | H01R 13/4364 |
| 11,024,984 | B2 | 6/2021 | Blumenshein et al. | |
| 11,336,058 | B2 | 5/2022 | Liptak et al. | |
| 11,411,352 | B2 | 8/2022 | Droesbeke et al. | |
| 2007/0066148 | A1 * | 3/2007 | Froschl | H01R 4/183 439/752 |
| 2017/0110222 | A1 | 4/2017 | Liptak et al. | |

FOREIGN PATENT DOCUMENTS

| | | | |
|---|---|---|---|
| EP | 3641061 | A1 | 4/2020 |
| EP | 3706247 | A2 | 9/2020 |
| WO | 9006005 | A1 | 5/1990 |

* cited by examiner

COAXIAL ELECTRICAL TERMINAL WITH CRIMPED OUTER FERRULE

TECHNICAL FIELD

This application is directed to a coaxial electrical terminal with a crimped outer ferrule.

BACKGROUND

Performance requirements for automotive-grade coaxial terminal to coaxial cable retention are becoming stricter and are difficult to meet for miniaturized radio frequency (RF) connection systems. Higher RF performance and stringent electromagnetic compliance (EMC) requirements for miniaturized coaxial connection systems require consistent crimping of the terminal to coaxial cable to minimize variation in system performance.

SUMMARY

According to one or more aspects of the present disclosure, an electrical cable assembly includes a coaxial electrical terminal having an inner ferrule disposed between an insulator surrounding a central conductor of a cable and a shield conductor of the cable and an outer ferrule crimped to the shield conductor and in compressive contact therewith. The outer ferrule defines a pair of crimp wings extending from a first side of a base portion of the outer ferrule and a single crimp wing extending from a second side of the base portion opposite the first side. The single crimp wing is disposed within a gap between the pair of crimp wings.

According to one or more aspects of the present disclosure, the single crimp wing, the pair of crimp wings, and the base portion of the electrical cable assembly of the previous paragraph are bent to form a generally cylindrical tubular shape.

According to one or more aspects of the present disclosure, the outer ferrule of the electrical cable assembly of any one of the previous paragraphs has a consistent thickness.

According to one or more aspects of the present disclosure, mesial edges of the pair of crimp wings of the electrical cable assembly of any one of the previous paragraphs are in compressive contact with distal edges of the single crimp wing.

According to one or more aspects of the present disclosure, each of the pair of crimp wings of the electrical cable assembly of any one of the previous paragraphs has a trapezoidal shape.

According to one or more aspects of the present disclosure, the single crimp of the electrical cable assembly of any one of the previous paragraphs has a trapezoidal shape.

According to one or more aspects of the present disclosure, an inner surface of the outer ferrule of the electrical cable assembly of any one of the previous paragraphs defines a plurality of rhombus-shaped indentations.

According to one or more aspects of the present disclosure, the outer ferrule of the electrical cable assembly of any one of the previous paragraphs is also crimped to an outer insulator surrounding a portion of the shield conductor and is in compressive contact therewith.

According to one or arere aspects of the present disclosure, the single crimp wing and one crimp wing of the pair of crimp wings of the electrical cable assembly of any one of the previous paragraphs is in compressive contact with the outer insulator.

According to one or more aspects of the present disclosure, a method of forming an outer ferrule configured to secure a terminal to an electrical cable includes the steps of forming an outer ferrule preform from sheet metal of generally uniform thickness, wherein the outer ferrule preform has a central base portion, a pair of crimp wings extending from a first side of the base portion and a single crimp wing extending from a second side of the base portion opposite the first side and forming the base portion to have an arcuate shape.

According to one or more aspects of the present disclosure, the method of the previous paragraph further includes the step of forming a plurality of rhombus-shaped indentations in an inner surface of the outer ferrule preform.

According to one or more aspects of the present disclosure, in the method of the previous paragraphs the single crimp wing is a trapezoidal crimp wing, wherein the pair of crimp wings define a trapezoidal gap therebetween, and wherein a width of the trapezoidal crimp wing is greater than a width of the trapezoidal gap.

According to one or more aspects of the present disclosure, in the method of the previous paragraphs the width of the trapezoidal crimp wing is 0.5 to 1.0 mm greater than the width of the trapezoidal gap.

According to one or more aspects of the present disclosure, in the method of the previous paragraphs each of the pair of crimp wings has a right trapezoidal shape.

According to one or more aspects of the present disclosure, the method of any one of the previous paragraphs further includes the steps of placing an exposed shield conductor of the cable on the base portion of the outer ferrule preform and crimping the pair of crimp wings and the single crimp wing of the outer terminal preform over the exposed shield conductor to form an outer ferrule having a tubular shape. The single crimp wing is disposed within the gap, thereby pushing the pair of crimp wings apart and causing mesial edges of the pair of crimp wings to be in compressive contact with distal edges of the single crimp wing.

According to one or more aspects of the present disclosure, in the method of the previous paragraphs the pair of crimp wings, and the base portion of the outer ferrule form a generally cylindrical tubular shape.

According to one or more aspects of the present disclosure, in the method of the previous paragraphs the outer ferrule has a consistent thickness.

According to one or more aspects of the present disclosure, the method of any one of the previous paragraphs further includes the step of crimping the single crimp wing and one crimp wing of the pair of crimp wings such that they are in compressive contact with an outer insulator of the electrical cable.

According to one or more aspects of the present disclosure, an electrical cable assembly includes an electrical terminal having an attachment portion having a pair of crimp wings extending from a first side of a base portion of the attachment portion and a single crimp wing extending from a second side of the attachment portion opposite the first side. The single crimp wing is disposed within a gap between the pair of crimp wings. Mesial edges of the pair of crimp wings are in compressive contact with distal edges of the single crimp wing.

BRIEF DESCRIPTION OF THE DRAWINGS

The present invention will now be described, by way of example with reference to the accompanying drawings, in which.

DETAILED DESCRIPTION

This disclosure is directed to a coaxial electrical terminal with a crimped outer ferrule.

Figure 1:
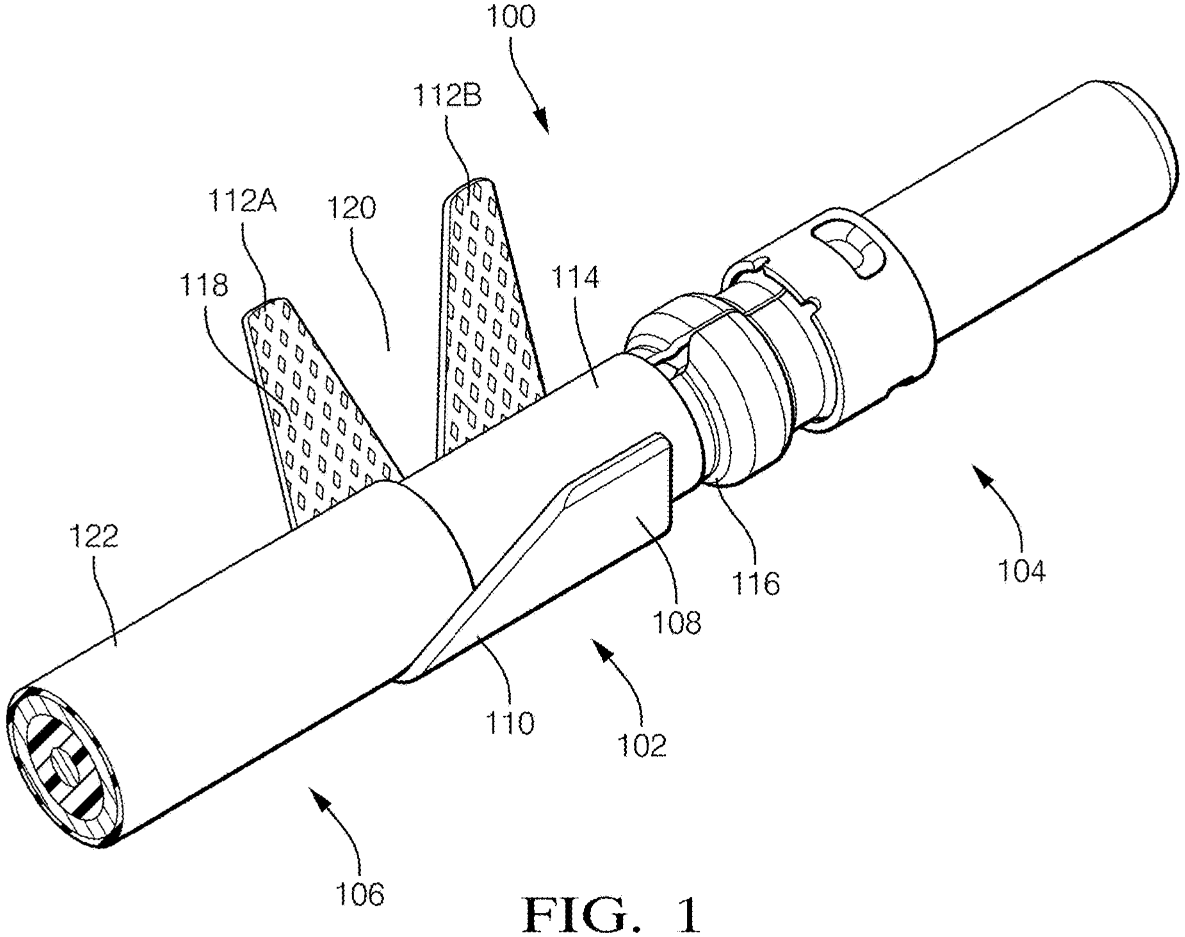
FIG. 1 illustrates an isometric view of a coaxial electrical cable assembly having an outer ferrule in a pre-crimped condition according to some embodiments.
Figure 2:
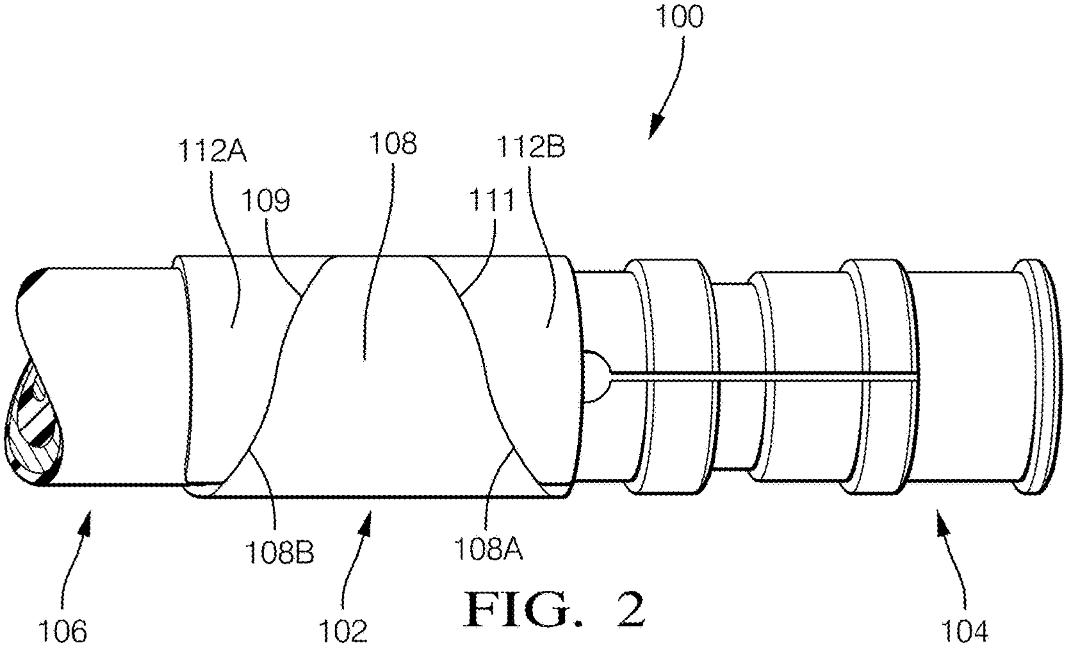
FIG. 2 illustrates an isometric view of the coaxial electrical cable assembly of FIG. 1 having the outer ferrule in a crimped condition according to some embodiments.

A non-limiting example of a coaxial terminal 100 is shown in FIGS. 1 and 2 includes an outer ferrule 102 which is an integral, single piece outer ferrule that is stamped from sheet metal, such as tin-plated brass and then formed into its desired shape using conventional metal forming techniques, such as crimping. The outer ferrule 102 may also include a carrier strip (not shown) to facilitate handling and processing of the outer ferrule 102. The carrier strip may be cut away and removed after attaching the outer ferrule 102 to the coaxial terminal 104 and coaxial cable 106.

The outer ferrule 102 has crimping wings in a double bypass arrangement that include a single trapezoidal shaped first crimp wing 108 extending from one side of a base portion 110 of the outer ferrule 102 and trapezoidal shaped second and third crimp wings 112A, 112B arranged as a pair that extend from the other side of the base portion 110. The second and third crimp wings 112A, 112B collectively 112. As used herein, a "bypass arrangement" means that one crimp wing does not overlie another but rather the crimp wings are in an adjacent relationship. The crimp wings 108, 112 are wrapped around and crimped to the shield conductor 114 which overlays the inner ferrule 116 of the coaxial terminal 104. The outer ferrule 102 secures the coaxial terminal 104 to the coaxial cable 106 and ensures a good quality connection between the shield conductor 114 and the inner ferrule 116.

The lengths and widths of the crimp wings 108, 112 may be tuned for optimal mechanical, RF, and EMC performance. A rhombus shaped knurled contact pattern 118 may be applied to an inner surface of the outer ferrule 102 including the base portion 110 and the crimp wings 108, 112 to enhance mechanical, RF, and EMC performance. The knurled contact pattern 118 provides multiple contact points between the outer ferrule 102 and the shield conductor 114, thereby reducing contact resistance and enhancing shielding performance.

Figure 3:
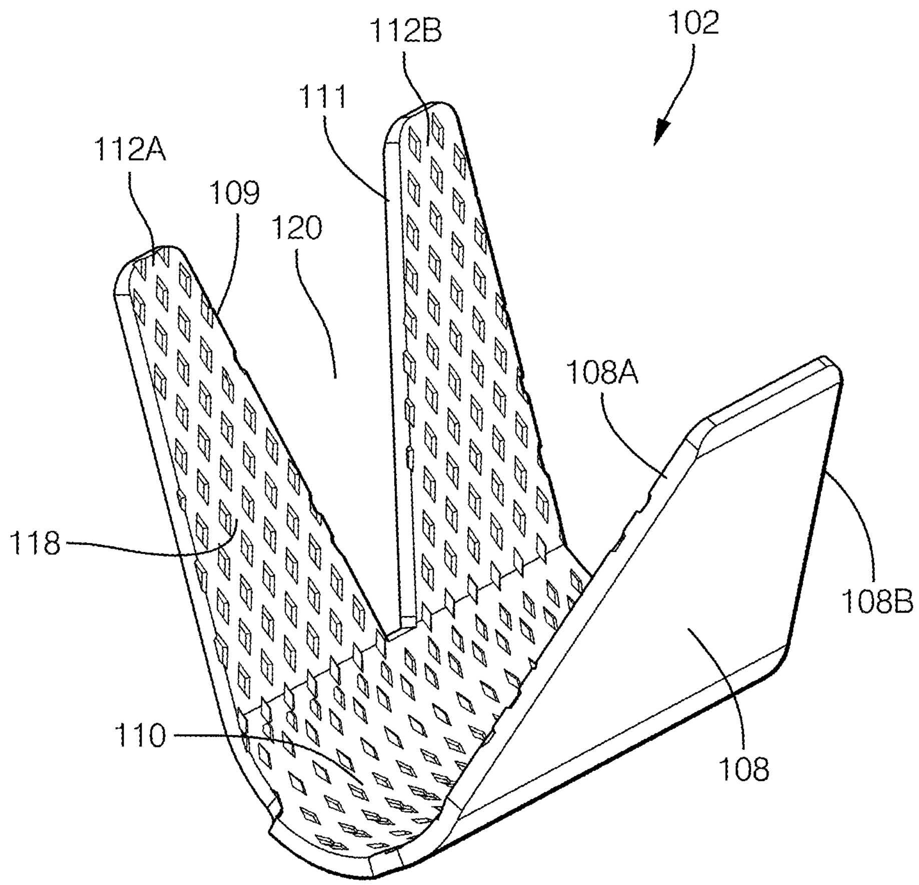
FIG. 3 illustrates an isolated isometric view of the outer ferrule of FIG. 1 in the pre-crimped condition according to some embodiments.
Figure 4:
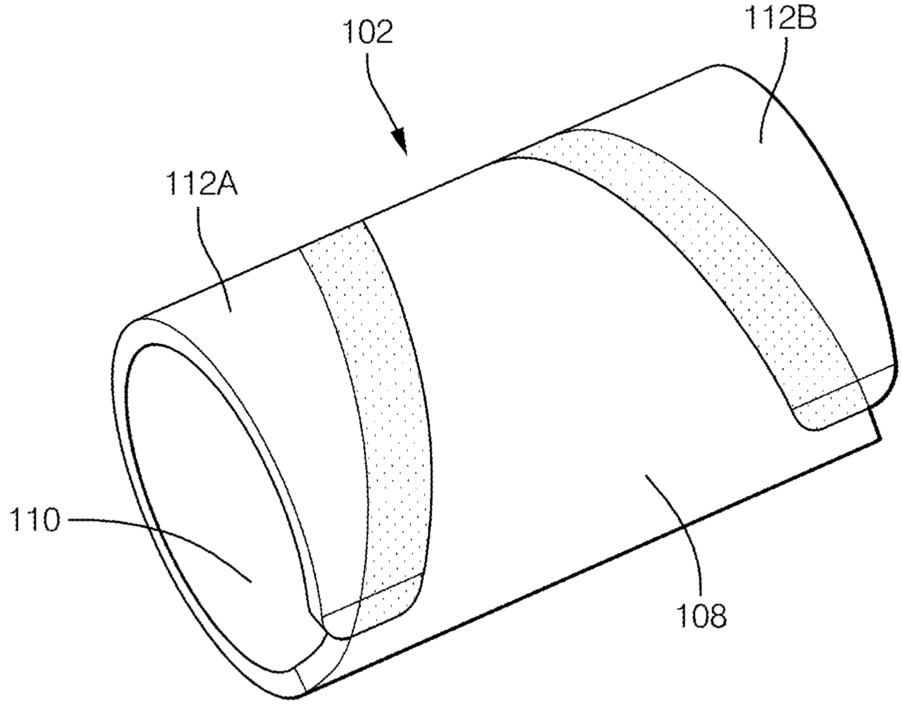
FIG. 4 illustrates an isolated isometric view of the outer ferrule of FIG. 2 in a crimped condition according to some embodiments.

The first crimp wing 108 is designed to interact with the second and third crimp wings 112A, 112B to create a bypass interference. As used herein, "bypass interference" means that outer edges 108A, 108B of the crimp wings 108, are adjacent to inner edges 109, 111 of the pair of crimp wings 112A, and 112B are in non-overlapping compressive contact. The trapezoidal geometry of the crimp wings 108, 112 provides optimal bypass interference due to the second and third crimp wings 112A, 112B defining a trapezoidal shaped gap 120 between them. As can be seen in FIG. 3, the gap 120 has a width that is narrower than the width of the first crimp wing 108, typically about 0.5 to 1 mm narrower, preferably 0.8 mm narrower. As shown in FIG. 4, the first crimp wing 108 is crimped such that it fills the gap 120 between the second and third crimp wings 112A, 112B and causes the distal (outer) edges 108A, 108B of the first crimp wing 108 to be in compressive contact with the mesial (inner) edges 109, 111 of the second and third crimp wings 112A, 112B. This compressive bypass interference between the first crimp wing 108 and the second and third crimp wings 112A, 112B shown by the shaded areas of FIG. 4, increases mechanical performance without requiring excessively tight crimp heights that negatively impact RF performance of the coaxial terminal 104. The first crimp wing 108 does not overlap the second and third crimp wings 112A, 112B and vice versa and so the outer ferrule 102 has a generally uniform thickness that provides a reduced packaging size within an electrical connector body. The inventors have observed that the order in which the crimp wings 108, 112 are crimped does not affect the effectiveness or strength of the attachment of the outer ferrule 102 to the coaxial terminal 104.

While the illustrated crimp wings 108, 112A, 112B and the gap 120 each have a trapezoidal shape, alternative embodiments may be envisioned in which they have different shapes, such as triangular or rectangular. In other alternative embodiments, the tips of the first, second, and third crimp wings and the gap near the base portion may be rounded.

Insulation strain relief is integrated into the outer ferrule design to provide mechanical robustness. The first and second crimp wings 108, 112A also are in compressive contact with the outer insulation jacket 122 of the coaxial cable 106 to provide robust strain relief and environmental conditioning performance. The crimp height of the second crimp wing 112A may be slightly higher than the crimp height of the third crimp wing 112B to accommodate the thickness of the outer insulation jacket 122 of the coaxial cable 106.

The outer ferrule 102 provides the benefit of accommodating coaxial cables of different diameters. The double bypass outer ferrule 102 presented herein has been found to provide a pull off force of up to 50% greater than that of single bypass crimped outer ferrules.

While the double bypass outer ferrule 102 shown herein is configured to use with a coaxial terminal 104 for low voltage applications e.g., less than 14 volts such as those used for digital or radio frequency signals, other embodiments may be used for a coaxial cable terminal for high voltage application, e.g., greater than 60 volts direct current (VDC) or 30 volts alternating current (VAC). The double-bypass crimp wing design may also by adapted to secure electrical terminals to solid or braided wire cables.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical cable assembly, comprising:

an electrical terminal having an inner ferrule disposed between an insulator surrounding a central conductor of an electrical cable and a shield conductor of the electrical cable; and an outer ferrule crimped to the shield conductor and in compressive contact therewith, the outer ferrule defining a pair of crimp wings, both having a trapezoidal shape, extending from a first side of a base portion of the outer ferrule and a single crimp wing having a trapezoidal shape and extending from a second side of the base portion opposite the first side, the single crimp wing, the pair of crimp wings, and the base portion being bent to form a generally cylindrical tubular shape and each of the pair of crimp wings and the single crimp wing having a length equal to at least half of a circumference of the outer ferrule, each crimp wing narrowing continuously from the base portion to its tip, the single crimp wing being wider than a trapezoidal gap between the pair of crimp wings which widens continuously from the base portion to its end, the single crimp wing being disposed within the gap such that mesial edges of the pair of crimp wings are in compressive contact with distal edges of the single crimp wing.

2. The electrical cable assembly in accordance with claim 1, wherein the outer ferrule has a consistent thickness.

3. The electrical cable assembly in accordance with claim 1, wherein each of the pair of crimp wings has a right trapezoidal shape.

4. The electrical cable assembly in accordance with claim 1, wherein an inner surface of the outer ferrule defines a plurality of rhombus-shaped indentations.

5. The electrical cable assembly in accordance with claim 1, wherein the outer ferrule is also crimped to an outer insulator surrounding a portion of the shield conductor and is in compressive contact therewith.

6. The electrical cable assembly in accordance with claim 5, wherein the single crimp wing and one crimp wing of the pair of crimp wings are in compressive contact with the outer insulator.

7. A method of forming an outer ferrule configured to secure an electrical terminal to an electrical cable, the method comprising:

forming an outer ferrule preform from sheet metal of generally uniform thickness, wherein the outer ferrule preform has a central base portion, defining a pair of crimp wings, both having a trapezoidal shape, extending from a first side of a base portion of the outer ferrule and a single crimp wing having a trapezoidal shape and extending from a second side of the base portion, each crimp wing narrowing continuously from the base portion to its tip, the pair of crimp wings defining a trapezoidal gap therebetween which widens continuously from the base portion to its end, and a width of the single crimp wing being greater than a width of the gap; and bending the single crimp wing, the pair of crimp wings, and the base portion to form a generally cylindrical tubular shape, each of the pair of crimp wings and the single crimp wing having a length equal to at least half of a circumference of the outer ferrule.

8. The method in accordance with claim 7, further comprising:

forming a plurality of rhombus-shaped indentations in an inner surface of the outer ferrule preform.

9. The method in accordance with claim 7, wherein the single crimp wing has a trapezoidal wing shape, wherein the gap between the pair of crimp wings has a trapezoidal gap shape.

10. The method in accordance with claim 9, wherein the width of the trapezoidal crimp wing is 0.5 to 1.0 mm greater than the width of the trapezoidal gap.

11. The method in accordance with claim 9, wherein each of the pair of crimp wings has a right trapezoidal shape.

12. The method in accordance with claim 9, further comprising:

placing an exposed shield conductor of the electrical cable on the base portion of the outer ferrule preform; and crimping the pair of crimp wings and the single crimp wing of the outer ferrule preform over the exposed shield conductor to form an outer ferrule having a tubular shape, wherein the single crimp wing is disposed within the trapezoidal gap, thereby pushing the pair of crimp wings apart and causing mesial edges of the pair of crimp wings to be in compressive contact with distal edges of the single crimp wing.

13. The method in accordance with claim 12, wherein the single crimp wing, the pair of crimp wings, and the base portion of the outer ferrule form a generally cylindrical tubular shape.

14. The method in accordance with claim 12, wherein the outer ferrule has a consistent thickness.

15. The method in accordance with claim 12, further comprising:

crimping the single crimp wing and one crimp wing of the pair of crimp wings such that they are in compressive contact with an outer insulator of the electrical cable.

16. An electrical cable assembly, comprising:

an electrical terminal having an attachment portion having a pair of crimp wings, both having a trapezoidal shape, extending from a first side of a base portion of the attachment portion and a single crimp wing having a trapezoidal shape and extending from a second side of the attachment portion opposite the first side, the single crimp wing, the pair of crimp wings, and the base portion being bent to form a generally cylindrical tubular shape and each of the pair of crimp wings and the single crimp wing having a length equal to at least half of a circumference of an outer ferrule, each crimp wing narrowing continuously from the base portion to its tip, the single crimp wing being wider than a trapezoidal gap between the pair of crimp wings which widens continuously from the base portion to its end, the single crimp wing configured to be disposed within the gap such that mesial edges of the pair of crimp wings are in compressive contact with distal edges of the single crimp wing.

17. The electrical cable assembly in accordance with claim 1, wherein the entirety of the mesial edges of the pair of crimp wings are in compressive contact with the entirety of the distal edges of the single crimp wing.

* * * * *